May 23, 1950   C. M. HUNTINGTON   2,508,391
TWO-CYCLE INTERNAL-COMBUSTION ENGINE
Filed April 16, 1946   2 Sheets-Sheet 1

INVENTOR.
CHARLES M. HUNTINGTON
BY
ATTORNEY.

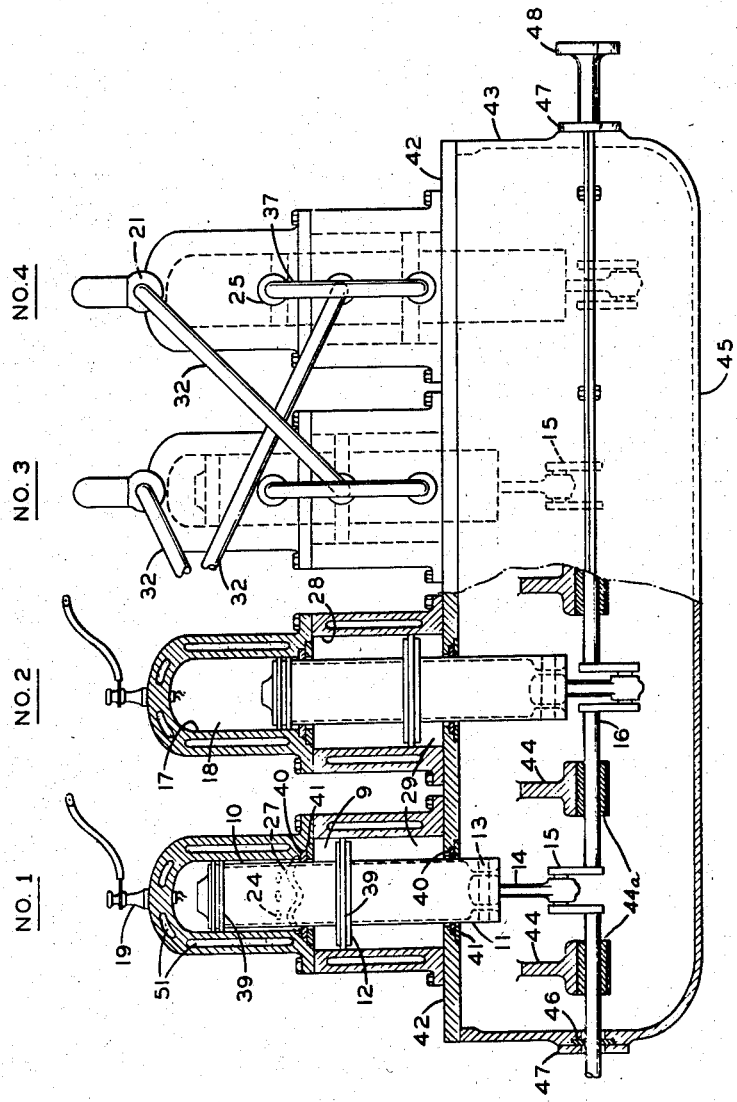

Patented May 23, 1950

2,508,391

UNITED STATES PATENT OFFICE 2,508,391

TWO-CYCLE INTERNAL-COMBUSTION ENGINE

Charles M. Huntington, United States Navy, Swarthmore, Pa.

Application April 16, 1946, Serial No. 662,431

2 Claims. (Cl. 123—59)

(Granted under the act of March 3, 1883, as amended April 30, 1928; 370 O. G. 757)

This invention relates to internal combustion engines and pertains more particularly to improvements therein.

The primary important object of the invention is to obtain more power from a two-cycle internal combustion engine through partial compression of the charges prior to delivery to the combustion chambers of the engine and better control of the volume of the charges and period of injection of the charges.

Another important object of the invention is to obtain improved power at, and smoother operation at slower speeds and better acceleration to full power by means of improved volumetric control of the charges delivered to each cylinder and positive pumping of the charges directly to the combustion chambers of the cylinders.

Another important object of the invention is to obtain simplified means for supercharging an engine for high altitude operation which may also be adjusted by simple mechanism to provide satisfactory compression ratios for low altitude operation at full power without excessive detonation.

Another important object of the invention is to provide means for accurately adjusting the period of delivery of the fuel air charges to the combustion chamber to permit partial expulsion of scavenging air prior to closing of exhaust ports and thereby obtain smoother operation of a two-cycle engine at slow speeds without an excessively rich fuel air mixture.

A still further object of the invention is to obtain well controlled and regulated timing of gas flow in the combustion chambers without the use of cams, pushrods and other mechanically operated devices connected directly or indirectly to and deriving their operation from the main crankshaft.

A still further object of the invention is simplification and more economical construction in an engine through the reduction of moving parts without loss of performance at various speeds.

Other objects and advantages will be apparent from the preferred embodiment of the invention described herein and from the accompanying drawings, in which:

Fig. 2 is a side elevation of this embodiment of the engine with a fragmentary vertical cross-section through two cylinders, crankcase and sump showing cylinders and connecting rods operably positioned therein.

Figures 1, 1A:
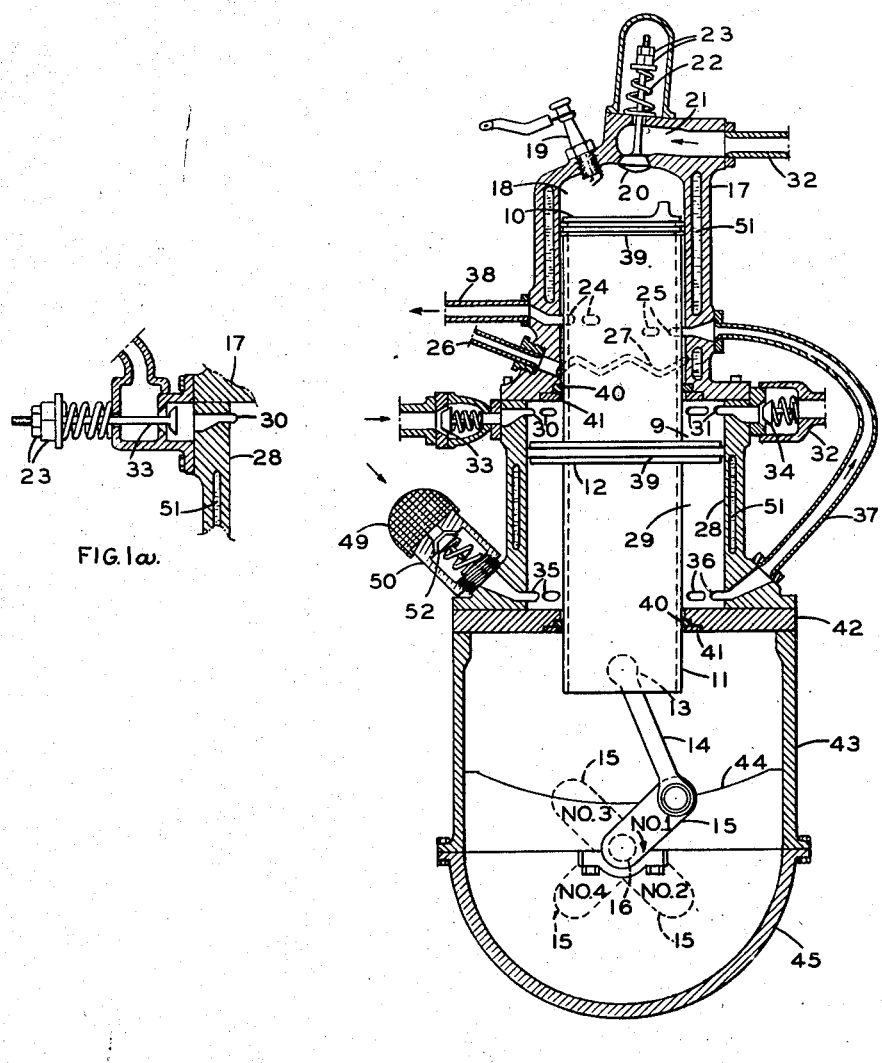
Fig. 1 is a vertical cross-section through the cylinder walls of a single cylinder, crankcase and sump in a plane transverse to the axis of the crankshaft showing the piston, piston rod and cranks operably positioned therein.
Figure 1a shows a view in section of one embodiment of the intake port.

Referring now to the drawings, in which like numerals indicate like parts in the several views, 10, 11 and 12 denote parts of the piston unit, 10 being that portion of the piston unit above the flange or secondary piston 12, and 11 being that portion of the piston unit below the secondary piston 12, 13 denotes the piston pin, and 14 denotes the connecting rod from piston unit to main crank 15. The numbers 1, 2, 3 and 4 on the cranks in Fig. 1 indicate the relative positions of cranks of the cylinders for this embodiment of the invention. Upper cylinder 17 is the power generating cylinder and contains the combustion chamber 18 into which piston 10 reciprocates. In the top of power cylinder 17 is provided conventional ignition means 19 and an intake valve 20 positioned in the intake valve chamber 21. In this embodiment of the patent, intake valve 20 is shown as a spring loaded check valve which is closed by spring 22, tension of said spring being regulated by position of lock nuts 23. In this embodiment fuel air charges are drawn into space 9 through supply ports 30 and the fuel air charges are ejected through discharge ports 31 to combustion chamber 18 of another cylinder unit than that superimposed on the supplying secondary cylinder 28 through supply conduits or pipes 32 but internal ducts within a cylinder casting could be substituted for pipes 32.

In this embodiment of the invention the upper compression spaces 9 supply fuel air charges to connected combustion spaces as follows:

Compression space 9 of No. 1 cylinder supplies combustion chamber 18 of No. 3 cylinder.

Compression space 9 of No. 2 cylinder supplies combustion chamber 18 of No. 1 cylinder.

Compression space 9 of No. 3 cylinder supplies combustion chamber 18 of No. 4 cylinder, and Compression space 9 of No. 4 cylinder supplies combustion chamber 18 of No. 2 cylinder.

In this invention scavenging air from any particular compression space 29 is supplied to combustion space 18 in the same cylinder unit, the piston 12 which forces the scavenging air into the said combustion chamber 18 being substantially part of the same piston unit as piston 10 in the receiving combustion chamber 18.

The fuel air charge which is forced into a combustion chamber 18 by the upward compression stroke of a piston 12 is delivered to the combustion chamber 18 substantially before the piston 10 reaches the top of its compression stroke. It is therefore readily apparent that piston 12 must reach the top of its compression stroke substantially in advance of piston 10 in the particular combustion space 18 to which a charge is delivered by a particular piston 12. It is also readily apparent that connections between fuel air compression chambers 9 and combustion spaces 18 will vary in engines with different crank arrangements and firing order, different numbers of cylinders and different arrangement of cylinders than that shown in this embodiment of the invention.

Since the regulation of tension on valve 20 permits wide control of the amount of compression of the fuel air charge allowed to take place before the fuel air charge begins to enter combustion chamber 18, then this means of controlling the admission of fuel air charges to accommodate different amounts of advance of compressing piston 12 in relation to position of piston 10 in receiving combustion chamber 18 is applicable to a wide variety of arrangements and connections of supply pipes 32 between compression spaces 9 and combustion chambers 18 in engines of different types.

To provide for unidirectional flow of fuel air mixture through compression chamber 9, spring loaded check valve 33 is provided on the inlet side of compression space 9 and spring loaded check valve 34 is provided on the discharge side of compression space 9. The check valve 33 in the embodiment shown in Figure 1a is adjustable by means of the lock nuts 23 to adjust the spring tension. This will vary the amount of fuel air mixture admitted to the compression space 9.

When piston 12 moves upward scavenging air is drawn into compression space 29 through air intake ports 35 and when piston 12 moves downward this scavenging air is compressed and discharged through air discharge ports 36 and pipe 37 to the particular combustion space 18 of cylinder 17 positioned above and in the same cylinder unit as the supplying compression space 29.

During one complete rotation of the crankshaft 16 the following successive operations take place in a single power cylinder 17; assuming that the power piston 10 and integral parts 11 and 12 are at the top dead center at the beginning of this description and that the charge in compression chamber 18 has been ignited. The pressure in combustion chamber 18 forces piston 10 downward and the crank moves from 0° to about 160° at which point piston 10 begins to uncover exhaust ports 24, at which time expanded gases begin to escape through ports 24 and exhaust pipe 38. As piston 10 continues to move downward, scavenging air ports 25 are uncovered at about 168° crank movement from top dead center. From about 168° to about 192° movement of crank, spent gases and scavenging air continue to escape from combustion space 18. At about 192° crank position, the scavenging air ports 25 are closed by upward movement of the piston 10. At slower engine speeds minimum back pressure remaining in combustion chamber 18 will be low and shortly after the scavenging air ports 25 are closed valve 20 will begin to open admitting the next fuel air charge. At such slow engine speeds the incoming fuel air charge will force out a portion of the scavenging air remaining in the combustion chamber 18 thereby permitting use of a leaner fuel air mixture in combustion chamber 18 than would be necessary if a greater amount of unexpelled scavenging air remained in combustion chamber 18. At substantially higher speeds the back pressure in combustion chamber 18 will delay admission of the fuel air charge in relation to discharge of scavenging air from combustion space 18 and will consequently increase the amount of scavenging air left in the combustion space 18 and at such engine speeds this characteristic of the operation of the engine will tend to increase the internal pressure in the combustion chamber 18 due to the increasing amount of scavenging air left in the cylinder when exhaust ports 24 are closed. Exhaust ports 24 are closed by upward movement of the piston 10 at about 200° movement of the crank. The fuel air mixture will continue to enter the combustion chamber 18 during upward movement of piston 10 until compression within combustion chamber 18 reaches a point where pressure plus spring tension on valve 20 is greater on the combustion chamber side of valve 20 than the pressure in valve chamber 21. This will occur substantially prior to the time piston 10 reaches top dead center on the compression stroke, due to the advanced position of the supplying piston 12 in relation to the position of receiving piston 10 as previously explained. Valve 20 is therefore closed substantially before piston 10 reaches top dead center. At normal operating speeds ignition will take place by conventional timing means, not shown herein, at about 3 to 10 degrees before the piston reaches top dead center or 360° crank movement.

Pistons 10 and 12 have internal expanding piston rings 39 conventionally positioned in grooves in their side walls to provide gas seals with the cylinder walls. External contracting sealing rings 40 are also positioned in the cylinder sidewalls at the bottoms of cylinders 17 to provide gas seals against the side walls of pistons 10 and other similar rings 40 are positioned within the openings in crankcase cover plate 42 through which pistons 11 reciprocate, to provide seals against the side walls of pistons 11. Rings 40 are held in position by means of retaining rings 41 which are rigidly secured to the stationary parts of the engine. Shaft 16 is operably positioned in crankcase 43 and is supported by crankcase webs 44 on which are provided crankshaft bearings 44a. The bottom of crankcase 43 is covered by pan 45.

Oil seals between crankshaft 16 and crankcase 43 are provided by oil seals 46 positioned at the ends of crankcase 43. The oil seals 46 are held in place by end plates 47. Coupling plate 48 is provided at one end of crankshaft 16 for attachment of engine to mechanism to be operated by the engine.

Screen 49 is provided at free end of scavenging air inlet pipe 50 to clean the scavenging air before admission into cylinder 28. Check valve 52 ensures one way movement of scavenging air through pipe 50.

In this embodiment of the invention pistons 10, 11 and 12 are indicated as a single part but such indication does not preclude manufacture of the different sections thereof as separate parts and subsequent assembly as one operating unit. Cylinders 17 and 28 are indicated as two separate parts but such indication does not preclude manufacture of the two parts as one integral unit.

In this embodiment the diameter of piston 10 is indicated to be the same as the diameter of piston 11. It is readily apparent that the amount of scavenging air admitted into compression space 29 is directly related to the difference between the internal diameter of cylinder 28 and the external diameter of piston 11. It is therefore within the scope and intent of this patent that the diameter of piston 11 will vary in relation to the diameter of pistons 10 and 12 depending on the intended use of the engine. In an engine designed for high supercharging and maximum performance at high altitudes, piston 12 would be substantially larger in relation to pistons 10 and 11 than for an engine designed primarily for maximum performance at sea level.

Lubrication of the cylinders 17 and 28 is indicated by oil pipe 26 and oil groove 27.

This embodiment also indicates the use of liquid in cooling chamber 51 but such presentation does not preclude the use of fins on the cylinder or other means for cooling the engines.

It is understood that the form of the engine herewith shown and described is merely illustrative of a preferred embodiment and that changes and modifications may be made without departing from the spirit of the invention and the scope of the appended claims.

The invention described herein may be manufactured and used by or for the Government of the United States of America for governmental purposes without the payment of any royalties thereon or therefor.

What I claim is:

1. In a two-cycle internal combustion engine having at least three cylinders aligned along a crankshaft, each of said cylinders having an upper combustion chamber portion and a larger lower chamber portion, the combination of a connecting duct between said upper and lower portion of each cylinder and other connecting ducts between cylinders, a reciprocative piston in each cylinder coacting therewith to form a combustion chamber, each piston connected to one of a like number of equiangularly spaced cranks on a crankshaft in said engine, ignition means and an intake port in the top of each combustion chamber, an exhaust port and a scavenging air port in the lower end of each of said cylinder combustion chamber portions, an annular flange on each piston operable in the larger portion of each cylinder to form a double-ended compressor, the bottom portion of each compressor adapted to supply scavenging air to the combustion chamber of the same cylinder through one of said connecting ducts, the upper portion of each compressor adapted to supply an air-fuel mixture through another of the connecting ducts to the combustion chamber of another cylinder of said engine the piston of which is sequentially following the piston of the supplying compressor, and a pressure responsive valve in the inlet port of each combustion chamber whereby the air-fuel mixture supplied to each chamber is measured and timed by the coordinated action of said valve and the supplying compressor.

2. The combination defined in claim 1 further characterized in that there are four cylinders with associated pistons and cranks aligned along said crankshaft and that the said pressure responsive valve in the inlet port of the individual combustion chambers will admit air-fuel mixture into the individual combustion chambers as is required after the crank associated with the piston of the individual chambers has reached a position of approximately 192° from its top center position.

CHARLES M. HUNTINGTON.

REFERENCES CITED

The following references are of record in the file of this patent:

UNITED STATES PATENTS

| Number | Name | Date |
|---|---|---|
| 729,194 | MacHaffie | May 26, 1903 |
| 1,127,322 | Tuttle | Feb. 2, 1915 |
| 1,140,384 | Lindsay | May 25, 1915 |
| 1,327,345 | Mayers | Jan. 6, 1920 |
| 1,350,260 | Long | Aug. 17, 1920 |
| 1,358,513 | Boureau | Nov. 9, 1920 |
| 1,503,370 | Martin | July 29, 1924 |
| 1,505,211 | Lorbach | Aug. 19, 1924 |
| 1,774,105 | Neldner | Aug. 26, 1930 |
| 2,000,108 | Tucker | May 7, 1935 |
| 2,249,354 | Gehres | July 15, 1941 |

FOREIGN PATENTS

| Number | Country | Date |
|---|---|---|
| 19,520 | Great Britain | Sept. 1, 1906 |